(12) United States Patent  (10) Patent No.: US 7,857,328 B1
Boss  (45) Date of Patent: Dec. 28, 2010

(54) MOBILE GARDEN TOOL CENTER

(76) Inventor: Gary Boss, 4136 McLaughlin Ave., Los Angeles, CA (US) 90066

(*) Notice: Subject to any disclaimer, the term of this patent is extended or adjusted under 35 U.S.C. 154(b) by 307 days.

(21) Appl. No.: 12/074,958

(22) Filed: Mar. 7, 2008

Related U.S. Application Data

(60) Provisional application No. 60/918,248, filed on Mar. 14, 2007.

(51) Int. Cl.
  *B62B 1/04* (2006.01)
  *B62B 1/20* (2006.01)
  *B62B 5/08* (2006.01)
(52) U.S. Cl. ............... 280/47.25; 280/47.131; 280/47.19; 280/47.26; 280/47.27; 280/47.35; 280/79.5
(58) Field of Classification Search ............ 280/47.131, 280/47.17, 47.19, 47.23, 47.24, 47.26, 47.27, 280/47.34, 47.35, 79.5, DIG. 6
See application file for complete search history.

(56) References Cited

U.S. PATENT DOCUMENTS

| | | | |
|---|---|---|---|
| 3,759,538 A | * | 9/1973 | Fabiano ............... 280/47.35 |
| 4,460,188 A | * | 7/1984 | Maloof ................. 280/30 |
| 5,484,160 A | | 1/1996 | Ek |
| 5,507,508 A | * | 4/1996 | Liang ................... 280/37 |
| 6,213,314 B1 | | 4/2001 | Beemer |
| 6,241,313 B1 | * | 6/2001 | Lenz et al. ............. 297/217.1 |
| 6,398,235 B1 | * | 6/2002 | Cary ................... 280/47.26 |
| 6,520,513 B2 | | 2/2003 | Presley-Mays |
| 6,929,269 B2 | * | 8/2005 | Oliver .................. 280/47.18 |
| 7,097,017 B1 | * | 8/2006 | LaCrosse et al. ......... 190/8 |

* cited by examiner

*Primary Examiner*—J. Allen Shriver, II
*Assistant Examiner*—Bryan A Evans
(74) *Attorney, Agent, or Firm*—Emery L. Tracy

(57) ABSTRACT

A mobile garden tool center is provided. The mobile garden tool center comprises a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms. A barrel is restable on the carrying platform and is releasably secured to support frame of the cart with at least one strap. At least one tube is secured to the support frame of the cart. A basket is releasably attached between the upper support arms. A compactable stool is pivotally connected to the lower support arms.

16 Claims, 1 Drawing Sheet

MOBILE GARDEN TOOL CENTER

The present application is a continuation of pending provisional patent application Ser. No. 60/918,248, filed on Mar. 14, 2007, entitled "Mobile Garden Tool Center".

BACKGROUND OF THE INVENTION

1. Field of the Invention

This invention relates generally to a mobile garden tool center and, more particularly, the invention relates to a mobile garden tool center for storing and transporting a variety of lawn and garden implements.

2. Description of the Prior Art

Gardening and landscaping are important and satisfying aspects of home ownership for both men and women. As these activities allow people to use both the intellect and physical strength, they can contribute different talents to creating something that is both tangible and enjoyable. Whether bordering a home with a vibrant collection of floral beauties, pruning hedges to alluring and intricate shapes, fashioning a vegetable garden to supply fresh foods, or simply mowing a lawn to attractive precision, lawn and garden enthusiasts find joy, relaxation, and a sense of accomplishment in improving the outside appearance of their home.

While yard work can provide, both, satisfaction for the spirit and exercise for the body, many who relish the opportunity to participate in landscaping and gardening activities sometimes encounter challenges in their beautification endeavors. Particularly, keeping up with all the tools and accessories required for particular gardening jobs can be a time consuming and daunting process. By way of example, a homeowner using a trowel to plant a flowerbed may also need seeds, fertilizer, and a rake in order to complete the task. With no means of keeping these necessary items conveniently within reach, the gardener may be forced to make repeated trips to the garage or gardening shed in order to retrieve the needed accessories. Similarly, someone trimming hedges may have to struggle with the clippers, a rake, and a recycling bin while shaping up their greenery. As a result, gratifying outdoor projects can sometimes lead to frustration.

SUMMARY

The present invention is a mobile garden tool center. The mobile garden tool center comprises a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms. A barrel is restable on the carrying platform and is releasably secured to support frame of the cart with at least one strap. At least one tube is secured to the support frame of the cart. A basket is releasably attached between the upper support arms. A compactable stool is pivotally connected to the lower support arms.

The present invention further includes a method for providing supplies and tools for gardening. The method comprises providing a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms, resting a barrel on the carrying platform, releasably securing the barrel to support frame of the cart with at least one strap, securing at least one tube to the support frame of the cart, positioning a long handled tool within at least one of the tubes, releasably attaching a basket between the upper support arms, positioning small handled tools in the basket, and pivotally connecting a compactable stool to the lower support arms thereby allowing a seated position to ease gardening tasks.

DETAILED DESCRIPTION OF THE PREFERRED EMBODIMENTS

Figure 3:
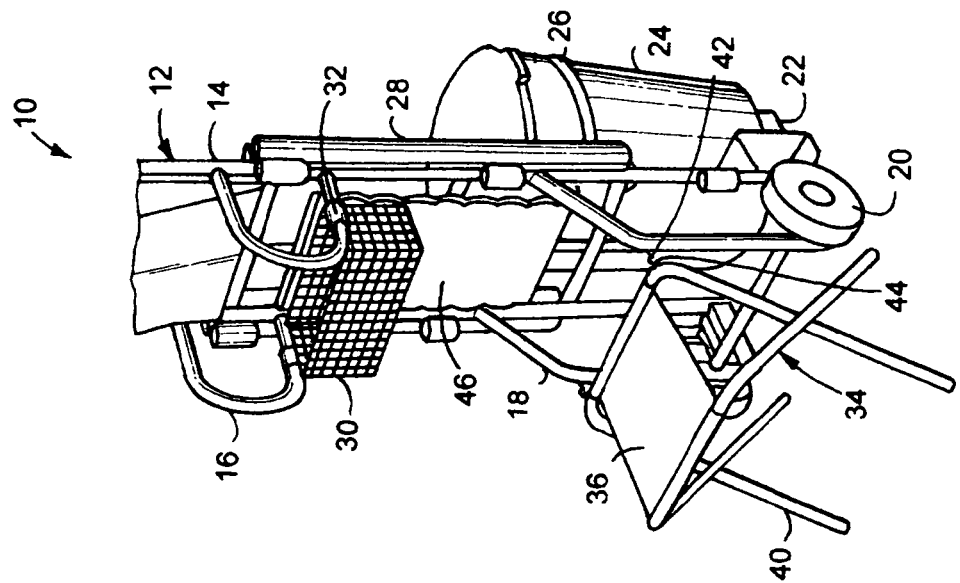
FIG. 3 is another rear perspective view illustrating the mobile garden tool center, constructed in accordance with the present invention, with a seat in an unfolded position.
Figure 2:
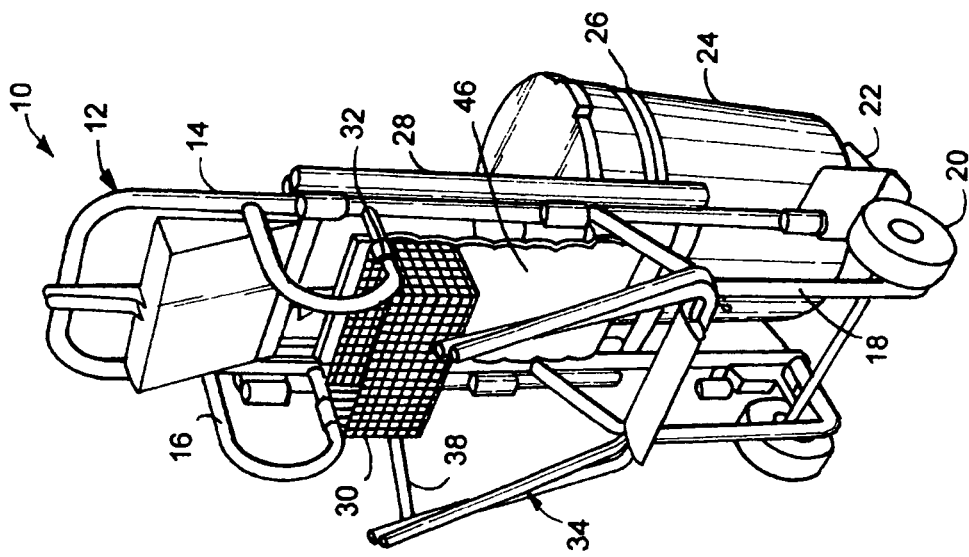
FIG. 2 is a rear perspective view illustrating the mobile garden tool center, constructed in accordance with the present invention.
Figure 1:
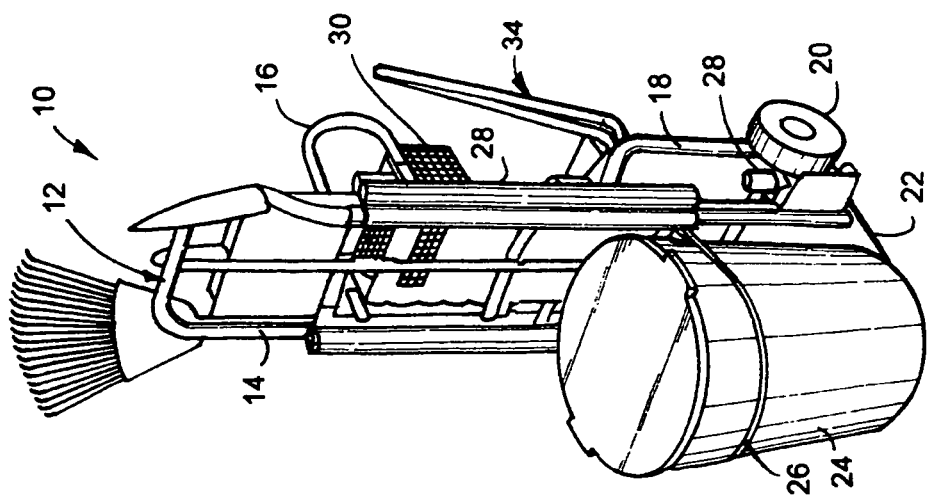
FIG. 1 is a front perspective view illustrating a mobile garden tool center, constructed in accordance with the present invention.

As illustrated in FIGS. 1-3, the present invention is a mobile garden tool center, indicated generally at 10, offering a convenient solution to the problems gardeners often encounter with the accessibility of needed items. Simply stated, the mobile garden tool center 10 of the present invention is a specially designed, portable receptacle system for storing and transporting a variety of lawn and garden implements.

Consisting of multiple components, the mobile garden tool center 10 of the present invention is mainly comprised of a heavy duty, metal-based transport cart or dolly 12. The cart 12 has a support frame 14 with two upper support arms 16 and two lower support arms 18 secured to and extending from the support frame 14. A pair of wheels 20 is rotatably secured to the lower support arms 18. A carrying platform 22 is attached to the support frame 14 opposite the lower support arms 18. The mobile garden tool center 10 of the present invention preferably measures approximately five feet, eight inches (5' 8") in height, approximately nineteen (19") inches to twenty-one (21") inches in width, a cart 12 depth of approximately eighteen (18") inches, a barrel depth of approximately thirty-six (36") inches, and a barrel circumference of approximately ninety-two (92") inches. It should be noted that the described and illustrated dimensions of the mobile garden tool center 10 are preferred dimensions and other dimensions are within the scope of the present invention.

The mobile garden tool center 10 of the present invention further includes a large, weather resistant barrel 24 resting on the carrying platform 22 and releasably secured to support frame 14 of the cart 12 with at least one strap 26. Preferably, the barrel 24 is constructed from a plastic material and each of the straps 26 is constructed from a durable nylon material although constructing the barrel 24 and each of the straps 26 from other materials is within the scope of the present invention.

The barrel 24 of the mobile garden tool center 10 of the present invention serves as the storage bin for a variety of large tools and implements, such as small handled tools, bags of seed and fertilizer, and similar items. In addition, the barrel 24, when emptied, can be employed as a refuse container.

To assist in carrying long handled tools, the mobile garden tool center 10 of the present invention further includes at least one tube 28 secured to the support frame 14 of the cart 12. The tubes 28 can be constructed as a single tube or a series of aligned smaller tubes, or both, depending on the desires of the manufacturer and/or user.

In addition, the mobile garden tool center 10 of the present invention further includes a basket 30 is releasably attached between the upper support arms 16 on a back side of the cart 12 for storing smaller tools and other items. The basket 30 has two open hooks 32 allowing the basket 30 to rest upon the upper support arms 16. Preferably, the basket 30 is constructed from a wire mesh material although constructing the basket 30 from other materials is within the scope of the present invention.

Further, the mobile garden tool center 10 of the present invention has a compactable stool 34 with a heavy duty canvas seat 36 pivotally connected to the lower support arms 18 of the cart 12 allowing users to sit and relax while attending to a gardening task. When not in use, a bracketed cable 38 holds the stool 34 in a substantially upside down manner. When in use, the bracketed cable 38 is disengaged and the stool 34 rotates into an upright position with legs 40 of the stool 34 resting on the ground. Eyebolts 42 threaded into the lower support arms 18 receive a hook 44 on the stool 34 to releasably secure the stool 34 to the lower support arms 18.

Further yet, the mobile garden tool center 10 of the present invention has a kneeling pad 46 stored behind the basket 30 with a clamping mechanism to releasably secure the kneeling pad 46 to the support frame 14 of the cart 12. In a preferred embodiment, the clamping mechanism is a heavy-duty, weather resistant clip.

The manner of use of the mobile garden tool center 10 of the present invention will now be described. It will be understood by those skilled in the art that the manner of use of the mobile garden tool center 10 described herein is merely one method of use and other methods of use of the mobile garden tool center 10 are within the scope of the present invention.

Use of the mobile garden tool center 10 of the present invention is very simple and straightforward. First, the barrel 24 and the basket 30 are filled with the needed items for the particular outside tasks that will be undertaken. As such, should the user decide to spend the day attending to several gardening chores, they only need to wheel the cart 12 and barrel 24 from task to task, reaching into the mobile garden tool center 10 for shovels, seeds, and pesticides whenever needed. The convenient stool 34 can easily be removed from the cart 12 and employed when one needs to crouch down for an extended period of time, such as when working with potted plants or weeding a row of flowers. After use, the mobile garden tool center 10 can remain stocked, and simply rolled into garage or gardening shed until needed for the next landscaping undertaking.

The mobile garden tool center 10 of the present invention affords users several significant benefits and advantages. Foremost, the mobile garden tool center 10 allows gardening enthusiasts to have any necessary accessory conveniently within reach at all times. Containing a large, barrel-like receptacle 24 that can sufficiently hold everything from hardware and gloves to seeds and chemicals, the mobile garden tool center 10 allows users to avoid the frustrating task of juggling multiple items. Moreover, the transporting capabilities offered by the mobile garden tool center 10 allows all implements to be easily carted from job to job, eliminating the need to interrupt gardening chores to retrieve needed materials from other storage locations. Additionally, the convenient addition of an all-purpose stool 34 permits gardeners to relax while attending to their endeavors, alleviating fatigue while facilitating longer enjoyment in working outside. Extremely easy to use, the mobile garden tool center 10 can be put to work in a matter of seconds.

While primarily conceived with household users in mind, professional gardeners, landscape architects, and groundskeepers will certainly appreciate the benefits the mobile garden tool center 10 of the present invention. Made of durable, high quality, weather resistant materials, the mobile garden tool center 10 will withstand years of continued use.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A mobile garden tool center comprising:
  a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms;
  a barrel restable on the carrying platform and releasably secured to support frame of the cart with at least one strap;
  at least one tube secured to the support frame of the cart;
  a basket releasably attached between the upper support arms; and
  a compactable stool pivotally connected to the lower support arms;
  wherein the stool has a bracketed cable holding the stool in a substantially upside down manner, the bracketed cable being disengageable for rotating the stool into an upright position with legs of the stool resting on the ground.

2. The mobile garden tool center of claim 1 wherein each of the tubes are constructed as a single tube.

3. The mobile garden tool center of claim 1 and further comprising:
  a plurality of tubes;
  wherein the plurality of tubes are a series of aligned tubes.

4. The mobile garden tool center of claim 1 wherein the basket has two open hooks allowing the basket to rest upon the upper support arms.

5. The mobile garden tool center of claim 1 wherein the basket is constructed from a wire mesh material.

6. The mobile garden tool center of claim 1 wherein the stool has a canvas seat.

7. The mobile garden tool center of claim 1 and further comprising:
  a kneeling pad positionable behind the basket and releasably secured to the support frame of the cart.

8. A method for providing supplies and tools for gardening, the method comprising:
  providing a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms;
  resting a barrel on the carrying platform;
  releasably securing the barrel to support frame of the cart with at least one strap;
  securing at least one tube to the support frame of the cart;

positioning a long handled tool within at least one of the tubes;

releasably attaching a basket between the upper support arms;

positioning small handled tools in the basket;

pivotally connecting a compactable stool to the lower support arms;

holding the stool in a substantially upside down manner with a bracketed cable;

disengaging the bracketed cable; and rotating the stool into an upright position.

9. The method of claim 8 and further comprising:

constructing each of the tubes as a single tube.

10. The method of claim 8 and further comprising:

constructing each of the tubes from a series of aligned tubes.

11. The method of claim 8 wherein the basket has two open hooks and further comprising:

at least partially surrounding the upper support arms with the hooks.

12. The method of claim 8 and further comprising:

positioning a kneeling pad behind the basket; and releasably securing the kneeling pad to the support frame of the cart.

13. A mobile garden tool center comprising:

a transport cart having a support frame, upper support arms secured to and extending from the support frame, lower support arms secured to and extending from the support frame, a pair of wheels are rotatably secured to the lower support arms, and a carrying platform is attached to the support frame opposite the lower support arms;

a barrel restable on the carrying platform and releasably secured to support frame of the cart with at least one strap;

at least one tube secured to the support frame of the cart;

a basket releasably attached between the upper support arms, the basket having two open hooks allowing the basket to rest upon the upper support arms; and a compactable stool pivotally connected to the lower support arms, the stool having a bracketed cable holding the stool in a substantially upside down manner, the bracketed cable being disengageable for rotating the stool into an upright position with legs of the stool resting on the ground.

14. The mobile garden tool center of claim 13 wherein each of the tubes are constructed as a single tube.

15. The mobile garden tool center of claim 13 wherein each of the tubes are a series of aligned tubes.

16. The mobile garden tool center of claim 13 and further comprising:

a kneeling pad positionable behind the basket and releasably secured to the support frame of the cart.

* * * * *